US006832087B2

(12) United States Patent
Gwon et al.

(10) Patent No.: US 6,832,087 B2
(45) Date of Patent: Dec. 14, 2004

(54) LOW LATENCY MOBILE INITIATED TUNNELING HANDOFF

(75) Inventors: Youngjune Gwon, Mountain View, CA (US); Daichi Funato, Mountain View, CA (US); Guangrui Fu, Sunnyvale, CA (US); Atsushi Takeshita, Sunnyvale, CA (US)

(73) Assignee: NTT DoCoMo Inc., Tokyo (JP)

( * ) Notice: Subject to any disclaimer, the term of this patent is extended or adjusted under 35 U.S.C. 154(b) by 377 days.

(21) Appl. No.: 10/185,344

(22) Filed: Jun. 28, 2002

(65) Prior Publication Data

US 2003/0125027 A1 Jul. 3, 2003

Related U.S. Application Data

(63) Continuation-in-part of application No. 10/138,389, filed on May 3, 2002.
(60) Provisional application No. 60/334,481, filed on Nov. 30, 2001, and provisional application No. 60/343,491, filed on Dec. 21, 2001.

(51) Int. Cl.[7] .................................................. H04Q 7/20

(52) U.S. Cl. ...................................... 455/436; 370/331

(58) Field of Search ................................ 455/436, 437, 455/438, 439, 440, 441, 442, 443, 444; 370/331, 332, 333, 334, 338, 349, 392

(56) References Cited

U.S. PATENT DOCUMENTS

| 6,137,791 A | * | 10/2000 | Frid et al. ..................... 370/331 |
| 6,160,804 A | * | 12/2000 | Ahmed et al. ............... 370/349 |
| 6,496,505 B2 | * | 12/2002 | La Porta et al. ............. 370/392 |
| 6,662,011 B1 | * | 12/2003 | Sale et al. .................... 455/436 |
| 6,768,726 B2 | * | 7/2004 | Dorenbosch et al. ....... 370/331 |
| 6,785,256 B2 | * | 8/2004 | O'Neill ........................ 370/338 |

OTHER PUBLICATIONS

C. Perkins, "IP Mobility Support", IETF Network Working Group RFC 2002, Oct. 1996.
Karim El Malki et al., "Low Latency Handoffs in Mobile IPv4," <draft-ietf-mobileip-lowlatency-handoffs-v4-03.txt>, Oct. 2001.
James Kempf et al., "Supporting Optimized Handover for IP Mobility—Requirements for Underlying Systems," <draft-manyfolks-12-mobilereq-01.txt>, Nov. 2001.
S. Deering, "ICMP Router Discovery Message," RFC 1256, Sep. 1991.
David B. Johnson et al., "Mobility Support in IPv6," <draft-ietf-mobileip-ipv6-15.txt>, Jul., 2001.

(List continued on next page.)

Primary Examiner—Quochien B. Vuong
(74) Attorney, Agent, or Firm—Edward C. Kwok; MacPherson Kwok Chen & Heid LLP (57) ABSTRACT

The present invention provides a tunnel-based IP handoff process that can minimize the handoff latency associated with the standard Mobile IP registration. In the present invention, when neighboring nodes are detected, these detected nodes are identified as candidate nodes. Detection of just the existence of neighboring nodes should be possible even in situations where these neighboring nodes use different access technologies. For instance, pilot beacon signals may be taken as indication of the existence of candidate nodes although it may be impossible to compare them quantitatively if the beacon signals emanate from different access technologies. As soon as candidate nodes are identified, tunnels are established between the source node and the candidate nodes. The tunnels are used to forward data to the mobile node after a communication link between the mobile node and the source node goes down. As soon as the mobile node enters one of the neighboring networks and identifies a target node, the tunnels are torn down except the tunnel for the target node.

35 Claims, 4 Drawing Sheets

OTHER PUBLICATIONS

G. Dommety et al., "Fast Handovers for Mobile IPv6," <draft–ietf–mobileip–fast–mipv6–03.txt>, Jul. 2001.

A. Conta et al., "Internet Control Message Protocol for Internet Protocol Version 6 (ICMP6)," RFC 2463, Dec. 1998.

D. Funato et al., "Geographically Adjacent Access Router Discovery Protocol,"<draft–funato–seamoby–gaard–01.txt>, Nov. 2001.

James Kempf et al., "Post–handover Mobile Initiated Tunneling for Fast Mobile IPv4 Handover," <draft–kempf–mobileip–postmit–handover–00.txt>, Dec. 2001.

* cited by examiner

LOW LATENCY MOBILE INITIATED TUNNELING HANDOFF

This application is a continuation-in-part application of U.S. Non-Provisional application Ser. No. 10/138,389, filed May 3, 2002, entitled "Low Latency Mobile Initiated Tunneling Handoff," which is incorporated herein by reference. This application also claims the benefit of U.S. Provisional Application No. 60/334,481, filed Nov. 30, 2001, entitled "Low Latency Mobile Triggered Post Registration Tunneling Handoff Scheme for Mobile IPv4 and Mobile IPv6," and U.S. Provisional Application No. 60/343,491, filed Dec. 21, 2001, entitled "Proactive Source Triggering Post Mobile Initiated Tunneling Handoff," both of which are incorporated herein by reference.

FIELD OF THE INVENTION

This invention relates generally to the communication of digital data in digital data networks and more specifically to communication of digital data in wireless, mobile-access, Internet protocol-based data networks. This invention is particularly relevant to handoff operations performed by mobile nodes roaming in wireless, mobile-access, Internet protocol-based data networks.

BACKGROUND OF THE INVENTION

Throughout evolution of wireless communications systems, technical challenges associated with implementing wireless communication have always been posed by a mobile node (MN), as traveling from one area to another, irregularly changing its point of attachment to terrestrial radio access point (AP) with which it is communicating wirelessly. Indeed, the most critical factor in achieving good performance for mobility protocols is the design of handoff. A handoff occurs when a MN moves from one radio AP to another. A mere change of radio AP is called a "Layer 2 (L2) handoff," which does not involve any Layer 3 (L3) signaling at the IP level. If the new radio access point is associated with a new subnet, i.e., if the MN moves from one subnet to another, a changing in routing reachability occurs and requires Layer 3 (L3) protocol action. This L3 protocol action is called a "L3 handoff" and usually involves exchange of a series of IP messages that are used to update routing information for the MN to make sure that data destined to the MN is routed through the new subnet to the MN.

The Internet Engineering Task Force (IETF) has proposed several standards to deal with the handoff operations. For instance, IETF RFC 2002 titled "IP Mobility Support," which is usually referred to as Mobile IP Version 4 (IPv4), and draft working document <draft-ietf-mobileip-ipv6-17> entitled "Mobility Support in IPv6," also referred to as Mobile IP Version 6, both of which are incorporated herein by reference, describe how a MN can perform L3 handoffs between subnets served by different agents. Under Mobile IPv4, a MN is given a long-term home address by its home agent (HA) and uses the home address as the source address of all IP data that it sends. When located on a foreign subnet away from its home subnet, a "care-of address" (CoA) is associated with the MN and reflects the MN's current point of attachment. Through an L3 handoff, the CoA is registered in the MN's home agent to enable the HA to update its binding or data-routing information for the MN. A similar protocol is implemented under Mobile IPv6.

The L3 handoff process pursuant to RFC 2002 requires mobility agents, i.e., foreign agents and home agents, to advertise their presence via Agent Advertisement messages. A MN that receives these Agent Advertisements determines whether it is operating on its home subnet or a foreign subnet. When the MN detects that it has entered a new subnet, it obtains a CoA from Agents Advertisements sent from the foreign agent serving the foreign network. The MN then registers the new CoA by sending a registration request including the CoA to its home agent (HA). The L3 handoff completes when the HA receiving the registration request updates its internal binding information for the MN and returns a registration reply to the MN. After the registration, data sent to the MN's home address are intercepted by the HA, tunneled by the same to the MN's CoA, received at the tunnel endpoint (either at a FA or at the MN itself), and finally delivered to the MN. In the reverse direction, data sent by the MN is generally delivered to its destination using standard IP routing mechanisms, not necessarily passing through the HA.

Mobile IP was originally designed without any assumptions about the underlying link layers over which it would operate so that it could have the widest possible applicability. This approach has the advantage of facilitating a clean separation between L2 and L3 of the protocol stack, but it has negative consequences. Because of the strict separation between L2 and L3, a MN may only communicate with a directly connected FA. This implies that a MN may not begin the registration process until it obtains L2 connectivity to a new FA after having lost L2 connectivity to the old or previous FA. In addition, the registration process itself takes some time to complete as the registration request and reply messages propagate through networks between the MN to its HA. The time from the last L3 connectivity between the MN and the old FA, to the time when the L3 connectivity to a new FA has been established manifests itself as handoff latency. During this time period, the MN is not able to send or receive any data. The handoff latency resulting from standard Mobile IP handoff procedures could be greater than what is acceptable to support real-time or delay sensitive traffic.

Several protocol designs have been proposed for both Mobile IPv4 and IPv6 that seek to reduce the amount of handoff latency. For instance, Internet Draft "Low Latency Handoffs in Mobile IPv4" < draft-ietf-mobileip-lowlatency-handoffs-v4-03.txt>, which is incorporated herein by reference, proposes two techniques for minimizing the period of time when a MN is unable to send or receive data due to the delay in the Mobile IP registration process. One such technique is "pre-registration handoff" which allows the MN to communicate with a new FA while still connected to the old FA. The other is called "post-registration handoff" which provides for data delivery to the MN at the new FA even before the formal registration process has completed. More specifically, under the pre-registration handoff method, the old FA, initiated by an L2 trigger, notifies the MN of a new FA. The MN then begins an L3 handoff with the new FA while still in communication with the old FA, i.e., while receiving and sending data through the old FA. In other words, the pre-registration handoff method allows the L3 handoff to begin even before the L2 handoff begins and thus helps achieve seamless handoffs between old and new FAs. The new FA may initiate the pre-registration handoff by sending its presence through the old FA to the MN. Also, the MN may become an initiator of the pre-registration handoff by sending a Proxy Router Solicitation to the old FA, which in return advises the MN of the new FA. In any event, a prompt and timely L2 trigger is necessary to implement the pre-registration handoff.

The post-registration handoff method allows the old FA and new FA to utilize L2 triggers to set up a bi-directional tunnel (BDT) between the old FA and new FA that allows the MN to continue using the old FA while on the new FA's subnet. The post-registration handoff is likewise initiated by an L2 trigger that is provided to either the old FA or the new FA. Following a successful Mobile IP Registration between the MN and the old FA, the old FA becomes the mobility anchor point for the MN. Either the old FA or the new FA then receives an L2 trigger informing that the MN is about to move from the old FA to the new FA. The FA (old or new FA) receiving the trigger sends a Handoff Request to the other FA (new or old FA), which returns a Handoff Reply, thereby creating a bi-directional tunnel between the FAs. When the link between old FA and MN is disconnected, the old FA begins forwarding MN-bound data through the tunnel to the new FA. When a new link is established between new FA and MN, the new FA begins delivering the data tunneled from the old FA to the MN and forwards any data from the MN through the reverse tunnel to the old FA. After the L2 handoff is completed, the MN may, while sending and receiving data through the tunnel from the new FA, perform a formal Mobile IP registration with the new FA. The initiation of this formal registration may be delayed. Thus, the post-registration handoff enables a rapid establishment of service at the new FA.

Internet Draft "Fast Handovers for Mobile Ipv6" <draft-ietf-mobileip-fast-mipv6-03.txt>, which is incorporated herein by reference, proposes similar techniques for minimizing the handoff latency for Mobile Ipv6.

However, both pre and post-registration handoff methods build upon some critical assumptions. For instance, it is assumed in both methods that L2 triggers are properly fired well in advance to notify an upcoming change in the L2 point of attachment of the MN. In the real world, it cannot be expected that such L2 triggers are always properly fired well in advance. For instance, certain access technologies just do not support advance L2 triggering. Examples of such access technologies are IEEE 802.11 and Bluetooth.

Another assumption on which both pre and post-registration methods rely is that a target node is always identifiable well in advance of an L2 handoff. For example, it is well known to use beacon signal strength from nearby nodes for detecting reachability of the nearby nodes. But it is not a viable assumption that nearby nodes broadcast the same pilot beacon signal at the same strength level. In situations where heterogeneous networks coexist that support different access technologies, different beacon signals are broadcasted at various strength levels. Beacon signals from different access technologies are simply incomparable to determine one over another. After all, if a mobile node is surrounded by heterogeneous networks that support different access technologies, identification of a target node is impossible until the mobile node actually enters the subnet served by the target node.

Besides, there should be more than one motivation for firing an L2 trigger to notify an imminent L2 handoff. Anticipation of losing L2 connection with the currently connected network is not the only one motivation for L2 triggering. Timing of firing such an L2 trigger should differ, depending on the motivation behind it. The proposed pre and post-handoff protocols are simply not designed to handle difference in timing of such an L2 trigger.

BRIEF SUMMARY OF THE INVENTION

The present invention provides a tunneling handoff process that can minimize the handoff latency associated with the standard Mobile IP registration. One of the ways to minimize the handoff latency is to begin the preparation for a handoff process as early as possible, even before a target node is identified. In the present invention, when nearby nodes are detected, these detected nodes are identified as candidate nodes. Detection of the existence of nearby nodes should be possible even in the situation where these nearby nodes use different access technologies. For instance, pilot beacon signals may be considered advertisements of the presence of candidate nodes although it may not be possible to compare them qualitatively and quantitatively if the beacon signals emanate from different access technologies.

In the present invention, as soon as candidate nodes are identified, tunnels are established between the source node and the candidate nodes. The tunnels are used to forward data to the mobile node after a communication link between the mobile node and the source node goes down. As soon as the mobile node enters one of the nearby networks and identifies a target node, the tunnels are torn down except the tunnel for the target node.

More specifically, in the present invention, at least one of the mobile node and the source and target nodes is triggered to initiate the handoff process according to the present invention. Upon triggered, at least one candidate node is identified to the source node. A tunnel is established between the source node and each of the at least one candidate node. Then, one target node is identified from the at least one candidate node. Thereafter, the tunnels are removed except the tunnel for the one target node. Using the tunnel for the one target node, the mobile node keeps data communication with the source node through the one target node after the mobile node completes an L2 handoff from the source node to the one target node but before undergoing IP routing update with the one target node.

The mobile node may be triggered to initiate the handoff process according to the present invention or may self-trigger itself to initiate the handoff process according to the present invention when it detects the presence of at least one candidate node. Signals broadcasted from nearby nodes may be used to detect the existence of the nearby nodes. The signals broadcasted from the nearby nodes may be L2 pilot beacon signals.

A link up between the mobile node and the one target node is used as a trigger to determine the identity of the one target node. Once the one target node is identified, the mobile node may notify it to the source node. Alternatively, the one target node may identify itself to the source node.

A link down with the mobile node may be used as a trigger for the source node to begin forwarding data to one or more of the at least one candidate node. If the link down with the mobile node occurs after the tunnels are established but before one target node is identified, the source node begins forwarding data to all the at least one candidate node. If the link down with the mobile node occurs after one target node is identified, the source node begins forwarding data to the one target node, instead of forwarding data to all the candidate nodes. If the link down with the mobile node occurs after the tunnels are established but before one target node is identified, the source node buffers data to be forwarded to the mobile node until after one target node is identified, and it begins forwarding the buffered data and subsequent data to the one target.

DETAILED DESCRIPTION OF THE INVENTION

The preferred embodiments of the present invention are described herein with references to the drawings. The descriptions of the preferred embodiments contained herein are intended to be exemplary in nature and are not intended to limit the scope of the invention. It should particularly be noted that the present invention can be applied widely over IP-based access networks, irrespective of whether the networks implement Mobile IP version 4 (IPv4) or Mobile IP version 6 (IPv6). Thus, throughout this application, the term "agent" may be used interchangeably with the term "access router" or just "router" and so may "Agent Discovery" with "Neighbor Discovery," "Agent Solicitation" with "Router Solicitation" and "registration request" with "binding update." Especially, the term "agent" and the term "router" or "access router" may be collectively referred to as "mobility serving node" in this application.

Within an overall data network, two levels of handoff process are contemplated. The first level is a macro-level handoff or an IP handoff or an Layer 3 (L3) handoff, which involves a change in location of a mobile node such that it leaves one radio subnetwork served by one agent to go to another subnetwork served by another agent. Thus, through an L3 handoff, the mobile node's network link necessarily changes. The next level is a micro-level handoff or an Layer 2 (L2) handoff, which involves a change in the location of a mobile node within an AP subnetwork, in which case the mobile node's radio link changes but network link does not change. The handling of L2 handoff is standard in wireless, cellular communication networks.

Figure 1:
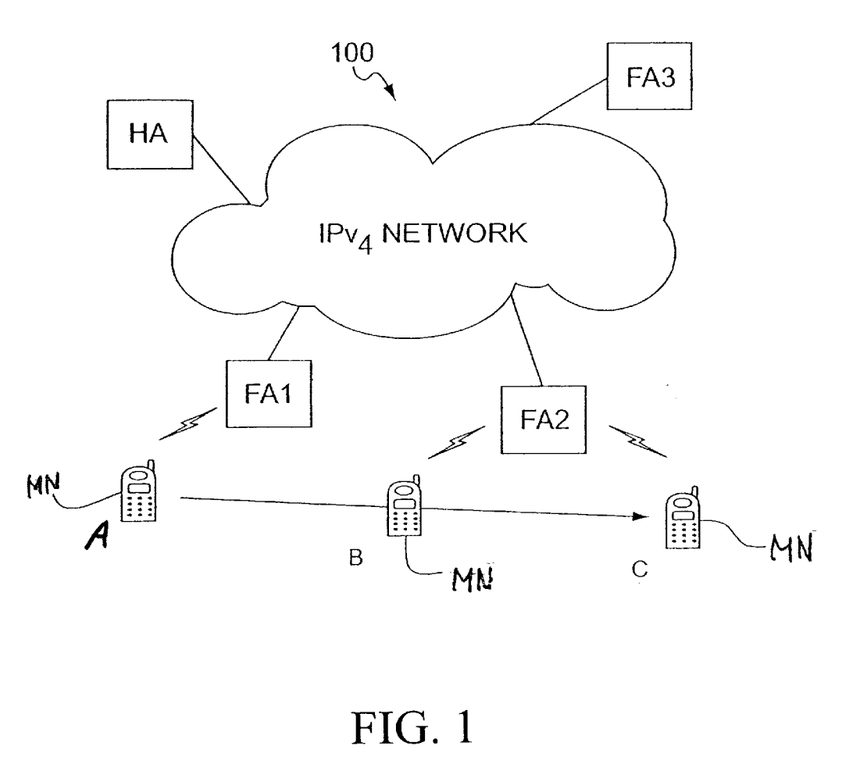
FIG. 1 is a simplified graphical representation showing the standard Mobile IP registration process.

FIG. 1 provides a simplified graphical illustration showing the standard Mobile IP L3 handoff process. The network 100 is an IP data network that implements IPv4. Again, IPv4 is just an example. It should be noted that the network 100 may implement other communication protocols, such as IPv6. Connected through gateways (not shown) to the network 100 are mobility agents 110 (HA, FA1, FA2 and FA3), each of which, as described above, operates its own subnet that consists of a group of APs (not shown).

A mobile node (MN) is currently located at a starting location A which is within the subnet operated by the FA1 and moving towards an end location C via an intermediary location B. The MN has originated from the HA and thus has a permanent home IP address given by the HA. But being within the FA1's subnet away from the HA's subnet, the MN has temporarily configured itself with a care-of address (CoA) provided by the FA1. As a result of the Mobile IP registration process that the MN previously performed with the FA1, the CoA has been registered in the HA as binding information. Therefore, any data that is destined to the MN is intercepted by the HA, tunneled to the FA1 and forwarded to the MN from the FA1. Outbound data from the MN may be routed back to the HA or sent directly to its destination.

As the MN moves from the starting location A and arrives at the intermediary location B, there comes a point where further wireless communication with the FA1 begins to fail. The MN is leaving the subnet operated by the FA1 and about to enter the subnet operated by the FA2. As the MN passes the intermediary location B, an L2 trigger is fired to inform the MN, FA1 and FA2 that the MN's L2 handoff is imminent. Preferably, the trigger is fired sufficiently before the MN loses its radio link with the FA1 so that the MN can complete the L2 handoff to the FA2 before it loses the FA1. Upon completion of the L2 handoff, the MN has a new radio link with the subnet operated by the FA2. Also, as soon as the MN enters the FA2's subnet, it begins to receive Agents Advertisements from the FA2. The Agents Advertisements from the FA2 function to inform the MN that it is now operating in the subnet served by the FA2.

As moving further towards the destination location C, the MN performs an L3 handoff or standard Mobile IP registration with the FA2. At the beginning of the registration process, the MN extracts a CoA from an Agent Advertisement from the FA2. The MN then registers the new CoA by sending, to the HA through the FA2, a registration request containing both the new CoA and the MN's permanent home IP address. In response, the HA updates the binding information of the MN in its binding cache and sends the MN a registration replay through the FA2, whereby an L3 link is established between MN and FA2. Hereafter, packets transmitted to the home IP address of the MN will be intercepted by the HA and tunneled by the HA to the FA2 and delivered to the MN from the FA2.

Please note that during the above standard Mobile IP registration process, there is a time period created during which the MN is unable to send or receive data. This time period is referred to as handoff latency, which starts at the time when the MN loses its radio communication with the FA1 and ends at the time when the MN completes the L3 handoff to the FA2. The contributing factors to this handoff latency appear to be the new agent discovery by the MN, the updating procedures at the HA, and probably most significantly, propagation of the registration request and replay messages between HA and FA2, which are likely to be separated by other intermediate local networks. The handoff latency resulting from the above standard Mobile IP registration process could be greater than what is acceptable to support real-time or delay sensitive traffic.

Figure 2:
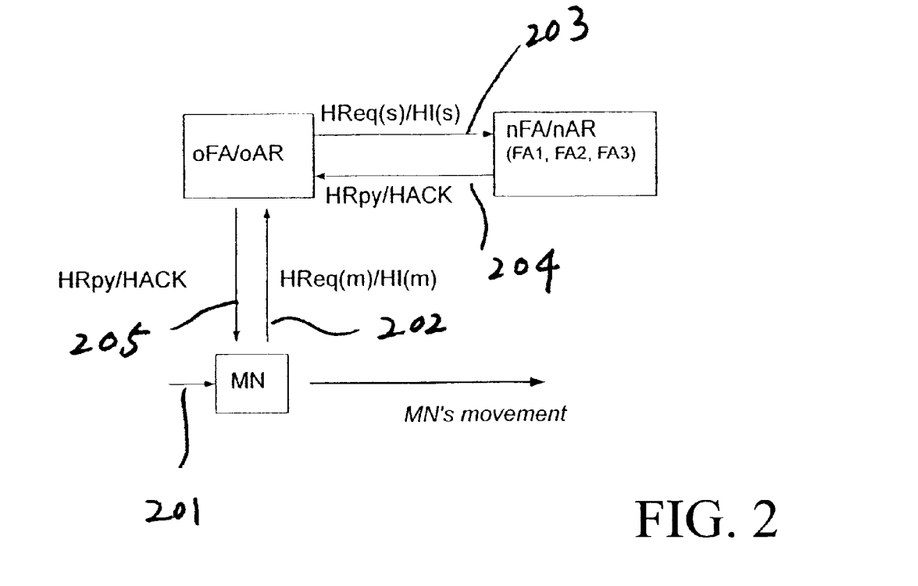
FIG. 2 is a diagram showing a Pre-L2 handoff Mobile Initiated Tunneling Handoff (Pre-MIT) for IPv4 according to an embodiment of the present invention.

The present invention provides a handoff scheme called a Pre-L2 handoff Mobile Initiated Tunneling handoff (Pre-MIT). FIG. 2 is a graphical representation illustrating a Pre-MIT for IPv4/IPv6 according to an embodiment of the present invention. In FIG.2 there are two FAs (or ARs) shown each of which has, as described above, its own subnet. A MN has been registered with an old FA (oFA or source) and is currently sending and receiving data through the oFA. The MN is now moving within the subnet served by the oFA. When the MN arrives at a certain point within the oFA subnet, the MN receives an L2 trigger informing that at least one candidate foreign agent is discovered (Step 201).

An L2 trigger is an abstraction of a notification from Layer 2 that a certain event has happened or is about to happen. There are three kinds of L2 triggers contemplated in the present invention. The first trigger is a trigger that notifies that at least one candidate node is discovered. The second trigger is called a link-down trigger that notifies the MN and the oFA that they have lost an L2 communication link that existed between them. The last trigger is called a link-up trigger that notifies the MN and a new FA (nFA or target) that a new L2 communication link has been established between them. In the present invention, the L2 triggers are not associated with any specific L2 signals but rather is based on the kind of L2 information that is or could be available from a wide variety of radio link protocols. Thus, the trigger may be implemented in a variety of ways. For instance, the L2 driver may allow the IP stack to register a callback function that is called when the trigger fires. The operating system may allow a thread to call into a system call for the appropriate trigger or triggers. The trigger may consist of a protocol for transferring the trigger notification and parameter information at either L2 or L3 between the new AP and the old AP. Alternatively, the trigger information may be available within the operating system kernel to the IP stack from the driver as an out of band communication. Also, triggers may come from any of the oFA, the nFA and even the radio access networks (RAN) or radio network controllers (RNC) that serve the subnets operated by the oFA and the nFA if those entities are capable of firing such L2 triggers.

Returning to Step 201 in FIG. 2, the MN receives an L2 trigger informing that at least one candidate node is discovered. It is important that however this L2 trigger is generated and wherever the trigger comes from, the trigger must be fired sufficiently before the MN loses its L2 connection with the oFA. The earliest possible timing of the L2 trigger is when the MN detects L2 pilot beacon signals from nearby FAs. In this embodiment, as soon as Layer 2 in the MN recognizes L2 beacons signals from nearby FAS, it generates an L2 trigger. With this L2 trigger, the MN self-triggers itself to proceed with the Pre-MIT according to the present invention.

Figure 3:
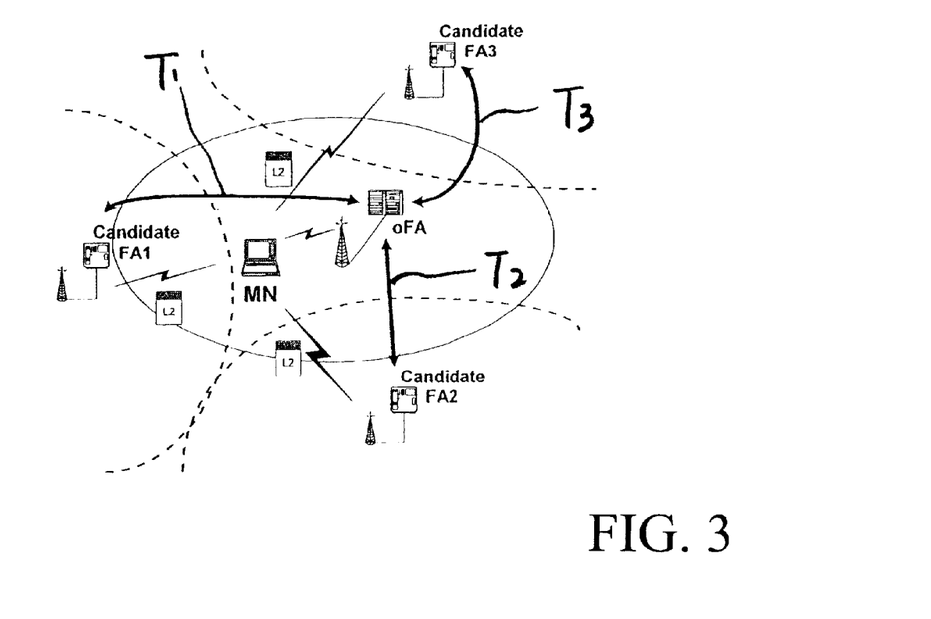
FIG. 3 is a graphical representation showing the circumstances assumed in the embodiment of FIG. 2.

Suppose that as shown in FIG. 3, the oFA is surrounded by three subnets served by foreign agents FA1, FA2 and FA3. Suppose further that pilot beacon signals from FA1, FA2 and FA3 all reach the MN and that the beacon signals from these foreign agents are strong enough that the MN identifies all of the three foreign agents as candidate agents. It should be noted that the MN does not use the beacon signals for selection of a target or new foreign agent but use the beacon signals to discover the foreign agents FA1, FA2 and FA3. The MN should be able to do this even if these foreign agents use different access technologies. Also, discovery of the foreign agents FA1, FA2 and FA3 should be able to be done well before an L2 handoff of the MN from the oFA is realized as imminent. However, when the MN discovers the three foreign agents, it is probably too early to determine to which foreign agent the MN will eventually hand over. It should also be noted that in the present invention, the MN will not determine to which foreign agent the MN will hand over. Such determination is sometimes impossible if nearby foreign agents use different access technologies. Thus, in the present invention, the MN will not know the identity of a target foreign agent until after it actually enters the subnet served the target agent.

Triggered by the L2 trigger notifying that three foreign agents FA1, FA2 and FA3 are discovered as candidate agents, the MN prepares and sends a mobile handoff request (HReq(m)) to the oFA (Step 202). The message format of the HReq(m) is discussed in detail in U.S. Non-Provisional application Ser. No. 10/138,389, filed May 3, 2002, entitled "Low Latency Mobile Initiated Tunneling Handoff," which has been incorporated herein by reference.

The HReq(m) has an Address field therein. The Address field contains link layer addresses or L2 identifiers (e.g., L2 addresses) of candidate foreign agents. Since FA1, FA2 and FA3 have been discovered as candidate foreign agents, the Address field in the HReq(m) from the MN to the oFA identifies three L2 identifiers, i.e., the L2 identifiers of FA1, FA2 and FA3. The MN may obtain these L2 identifiers from pilot beacon signals received from the FAs. The MN may be able to obtain the L3 or IP addresses of these FAs if Agent Advertisements from these FAs reach the MN.

It is assumed in this embodiment that foreign agents, including the oFA, are capable of performing neighbor agent discovery, e.g., the discovery mechanism discussed in Internet Draft "Generic Access Router Discovery," <daft-funato-seamoby-gard-00.txt>, which is incorporated herein by reference. This neighbor agent discovery mechanism allows one agent to identify other agents that are located adjacent to the one agent, irrespective of whether the geographically adjacent agents use the same access technology or different access technologies. It is therefore assumed that the oFA has performed the neighbor agent discovery, and based on the discovery results, the oFA has a table caching the IP addresses of nearby FAs in relation to their L2 identifiers. Thus, the table in the oFA identifies the IP addresses and the L2 identifiers of FA1, FA2 and FA3.

When receiving the HReq(m) from the MN, the oFA extracts the identifiers of FA1, FA2 and FA3 stored in the Address field. If the identifiers in the Address field are L2 identifiers, the oFA searches the table for the L3 addresses corresponding to the L2 identifiers. The oFA then prepares a Source Agent Handoff Request (HReq(s)) and sends it to each of the candidate FAs, i.e., FA1, FA2 and FA3 (Step 203). When receiving the HReq(s) from the oFA, the FA1, FA2 and FA3 open the extensions attached to the request and learn that the MN may hand over to one of them from the oFA. In response, these FAs send a Handoff Reply (HRply (t)) back to the oFA (Step 204), whereby a tunnel is established between oFA and each of FA1, FA2 and FA3. These tunnels T1, T2 and T3 are illustrated in FIG. 3. These tunnels may be unidirectional and used only to forward data from the oFA to the candidate FAs. Alternatively, the tunnels may be bidirectional and used to forward data back and forth between oFA and candidate FAs. The Handoff Replies from the candidate FAs are forwarded by the oFA to the MN (step 205). The HReq(s) and the HRply(t) are in a special message bit format which is discussed in detail in U.S. Non-Provisional application Ser. No. 10/138,389.

The present invention may also be used with Mobile IPv6. In Mobile IPv6, old foreign agent (oFA) and new foreign agent (nFA) are replaced with old access router (oAR) and new access router (nAR), respectively. There is no difference in basic protocols between the Pre-MIT for IPv6 and the counterpart for IPv4 already discussed above. The differences between them mainly reside in L3 messages used to implement the handoff operations. In Mobile IPv6, a HReq (m) is replaced with a HI(m). HReq(s) is replaced with HI(s). HRply(t) is replaced with HACK. Details of these IPv6 messages are also discussed in U.S. Non-Provisional application Ser. No. 10/138,389.

Figure 4:
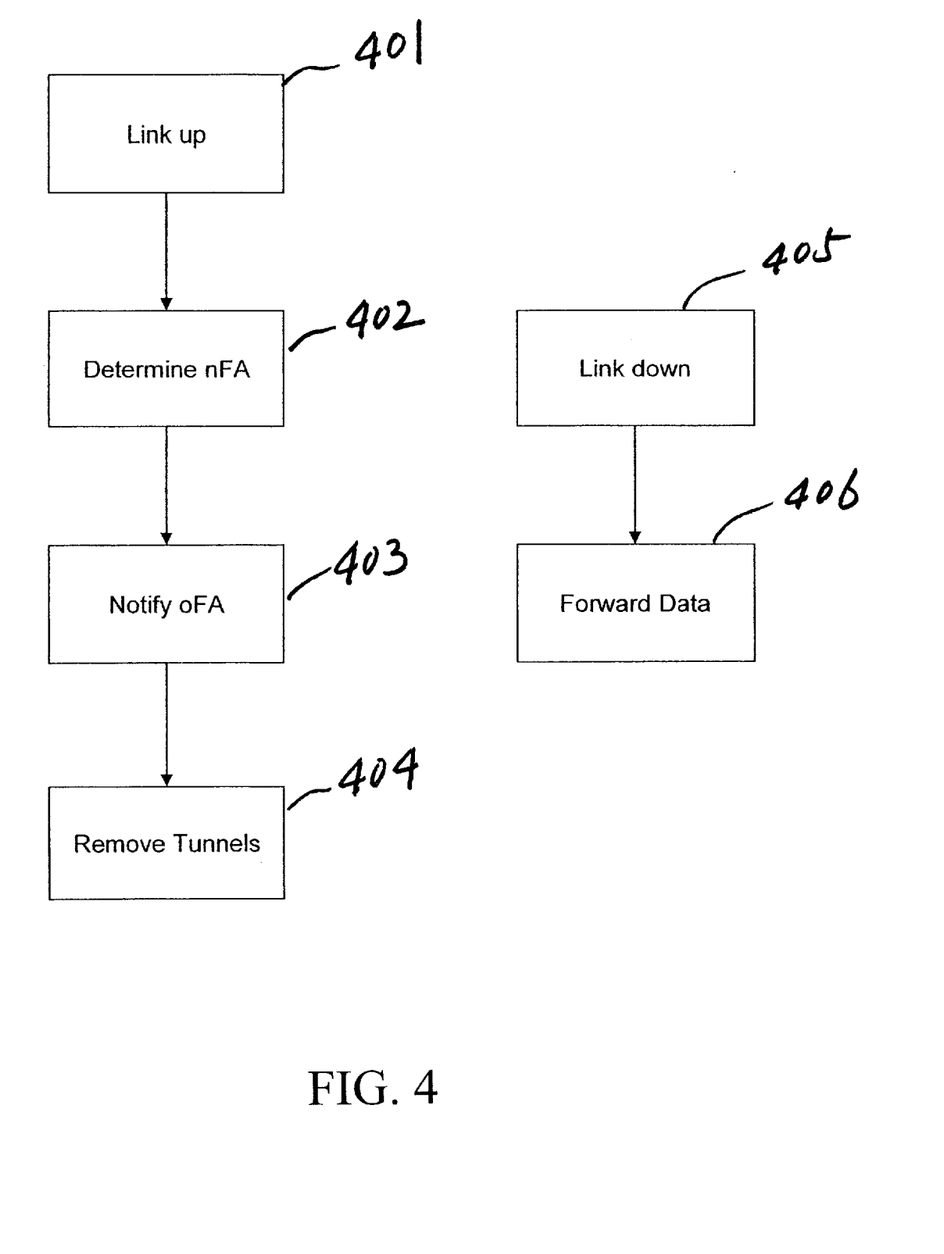
FIG. 4 is a flowchart showing timing analysis for Pre-MIT according to an embodiment of the present invention in which a new link goes up before an old link goes down.

The tunnel established between the oFA and each of FA1, FA2 and FA3 is not going to be used as long as the L2 link remains up between oFA and MN. As soon as the L2 link between oFA and MN goes down, the oFA starts forwarding data to FA1, FA2 and FA3 through the tunnels. The tunnels are eventually torn down, except one tunnel that is connected to the foreign agent to which the MN eventually establishes a link (new or target FA). But timing of tearing down the tunnels differs based on whether the old link between oFA and MN goes down before or after a new link goes up between MN and nFA (one of the candidate FAs). Link Up Before Link Down FIG. 4 is a flowchart showing a process according to an embodiment of the present invention in which the new link goes up before the old link goes down. When the old link goes down, both MN and oFA are notified by a link up trigger (L2 trigger). Similarly, when a new link goes up, both MN and nFA are notified by a link up trigger (L2 trigger). Suppose that a new link goes up between MN and one of FA1, FA2 and FA3 before the old link between MN and oFA goes down. Triggered by a link up signal, the MN realizes that it establishes a radio link with a new FA (Step 401). The MN then determines the identity of the new FA, i.e., FA1, FA2 or FA3 (Step 402). There are a couple of methods for determining the identity an agent with which the MN establishes a link. One method is to listen to an Agent Advertisement broadcasted from the agent. The Agent Advertisement contains information of the identity of the agent sending the Advertisement. In Step 403, the MN notifies the oFA of the nFA with which the MN has just established a link. If the link with the oFA remains up, the MN can directly notify the oFA of the identity of the nFA. If the link with the oFA has been lost by then, the MN may request the nFA to notify the oFA. Notified from the MN, the oFA tears down the tunnels connected to the other foreign agents, leaving the tunnel to the nFA intact (Step 404).

When the link between MN and oFA goes down (Step 405), the oFA begins forwarding data to the MN using the tunnels (Step 406). The link between MN and oFA can be lost at any time during the process after Step 401. If the link between MN and oFA goes down between Step 401 and Step 404, the oFA forwards data to all the candidate foreign agents, using their tunnels, until it is notified of the nFA. If the link between MN and oFA goes down after Step 404, the oFA forwards data only to the identified nFA. In this embodiment, the MN can force the link with the oFA to go down. Therefore, in a situation where the link between MN and oFA remains up after Step 404, the MN may force the link to go down if it determines that the new link with the nFA has become stable of is expected to become stable soon.

With the tunnel that remains up, the MN can receive data from the oFA while on the nFA's subnet. Thus, the tunnel between oFA and nFA allows the MN to continue using the oFA for data communication while on the nFA's subnet. This eliminates a possible source of handoff latency and enables a rapid establishment of service at the new point of attachment while minimizing the impact on real-time applications. The MN must eventually perform a formal Mobile IP registration illustrated in FIG. 1 after an L2 link with the nFA is established, but this can be delayed as required by the MN. Until the MN performs registration, a new FA and an old FA will setup and move a tunnel as required to give MN continued connectivity.

Link Up After Link Down

Figure 5:
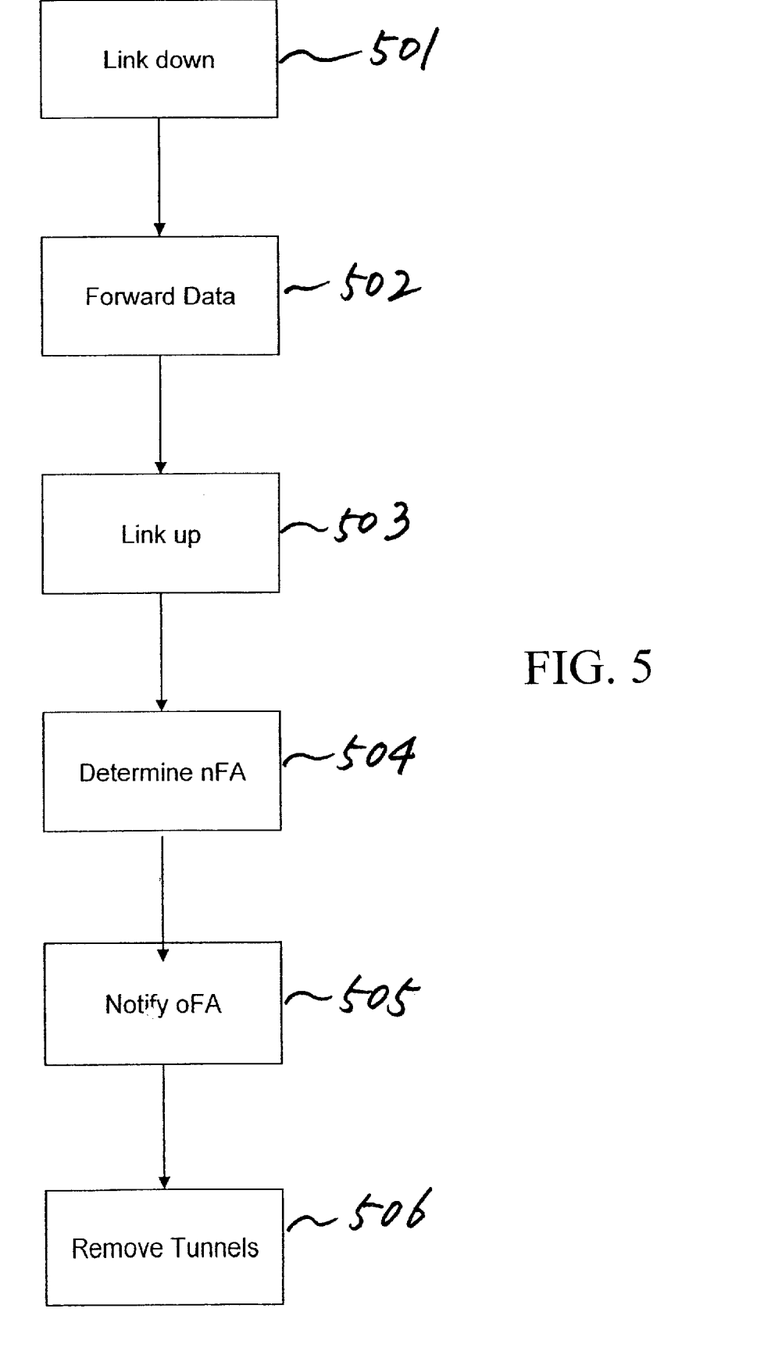
FIG. 5 is a flowchart showing timing analysis for Pre-MIT according to an embodiment of the present invention in which a new link goes up after an old link goes down.

FIG. 5 is a flowchart showing a process according to an embodiment of the present invention in which a new link goes up after an old link goes down. When the link between MN and oFA goes down (Step 501), the oFA starts forwarding data to all the candidate foreign agents, using their tunnels (Step 502). The data forwarded from the oFA has to be buffered at all the candidate foreign agents. Some time after Step 502, a link goes up between MN and one of the candidate foreign agent (Step 503). The MN determines the foreign agent with which the link just goes up (Step 504). The MN then requests the nFA to notify the oFA that a link is established between MN and nFA (Step 505). Notified by the nFA, the oFA tears down the tunnels for the other foreign agents (Step 506). From the nFA, the MN receives the buffered data and new data forwarded from the oFA. Alternatively, the oFA may buffer data for the MN after the link with the MN goes down before a new link goes up between MN and nFA. When the oFA is notified of the identity of the nFA, the oFA first tears down the tunnels for the other foreign agents and then starts forwarding buffered data and new data to the nFA, using the tunnel for the agent.

It should be appreciated that the foregoing detailed description is illustrative rather than limiting, and that it is the following claims, including all equivalents, that are intended to define the spirit and scope of this invention.

What is claimed is:

1. A method of implementing a low latency handoff by a mobile node between source and target nodes, comprising the steps of:

(a) triggering at least one of the mobile node and the source and target nodes to initiate the handoff process;

(b) identifying at least one candidate node to the source node;

(c) establishing a tunnel between the source node and each of the at least one candidate node before the mobile node completes an L2 handoff from the source node;

(d) identifying one target node from the at least one candidate node; and (e) removing the tunnel(s) established in step (c) except the tunnel for the one target node identified in step (d), wherein using the tunnel for the one target node, the mobile node keeps data communication with the source node through the one target node after the mobile node completes the L2 handoff from the source node to the one target node but before undergoing IP routing update with the one target node.

2. A method according to claim 1, wherein the mobile node is triggered to initiate the handoff process.

3. A method according to claim 2, wherein the mobile node self-triggers itself to initiate the handoff process when it notices existence of at least one candidate node.

4. A method according to claim 3, wherein broadcast signaling from a candidate node functions to notify the mobile node of existence of the node.

5. A method according to claim 4, wherein the broadcast signaling from the candidate node is L2 pilot beacon signaling.

6. A method according to claim 1, wherein the step (d) is initiated by a link up between the mobile node and the target node.

7. A method according to claim 1, wherein in the step (d), the mobile node identifies the one target node to the source node.

8. A method according to claim 1, wherein in step (d), the one target node identifies itself to the source node.

9. A method according to claim 1, wherein triggered by a link down with the mobile node, the source node begins forwarding data to one or more of the at least one candidate node identified in the step (b) through one or more of the tunnels established in the step (c).

10. A method according to claim 9, wherein if the link down with the mobile node occurs between the step (c) and the step (d), the source node begins forwarding data to all the at least one candidate node identified in the step (b).

11. A method according to claim 9, wherein if the link down with the mobile node occurs after the step (d), the source node begins forwarding data to the one target node identified in the step (d).

12. A method according to claim 9, wherein if the link down with the mobile node occurs between the step (c) and the step (d), the source node buffers data to be forwarded to the mobile node until after the step (d) and begins forwarding the buffered data and subsequent data to the one target node identified in the step (d) after the step (d).

13. A communication system, for implementing a low latency handoff by a mobile node between source and target nodes, comprising:

a trigger source that triggers at least one of the mobile node and the source and target nodes to initiate the handoff process, wherein the mobile node identifies at least one candidate node to the source node and further identifies one target node from the at least one candidate node, wherein the source node establishes a tunnel between the source node and each of the at least one candidate node identified by the mobile node before the mobile node completes an L2 handoff from the source node and, after the mobile node identifies one target node from the at least one candidate node, removes the tunnel(s) except the tunnel for the one target node, and wherein using the tunnel for the identified one target node, the mobile node keeps data communication with the source node through the one target node after the mobile node completes the L2 handoff from the source node to the one target node but before undergoing IP routing update with the one target node.

14. A system according to claim 13, wherein the trigger source triggers the mobile node to initiate the handoff process.

15. A system according to claim 14, wherein the trigger source is in the mobile node that self-triggers itself to initiate the handoff process when it notices existence of at least one candidate node.

16. A system according to claim 15, wherein broadcast signaling from a candidate node functions to notify the mobile node of existence of the node.

17. A system according to claim 16, wherein the broadcast signaling from the candidate node is L2 pilot beacon signaling.

18. A system according to claim 13, wherein a link up between the mobile node and a target node triggers the mobile node to identify one target node from the at least one candidate node.

19. A system according to claim 13, wherein the mobile node identifies the one target node to the source node.

20. A system according to claim 13, wherein the one target node identifies itself to the source node.

21. A system according to claim 13, wherein triggered by a link down with the mobile node, the source node begins forwarding data to one or more of the at least one candidate node through one or more of the tunnels.

22. A system according to claim 21, wherein if the link down with the mobile node occurs after the source node establishes a tunnel between the source node and each of the at least one candidate node but before the mobile node identifies the one target node from the at least one candidate node, the source node begins forwarding data to all the at least one candidate node.

23. A system according to claim 21, wherein if the link down with the mobile node occurs after the mobile node identifies the one target node, the source node begins forwarding data to the one target node.

24. A system according to claim 21, wherein if the link down with the mobile node occurs after the source node establishes a tunnel between the source node and each of the at least one candidate node but before the mobile node identifies the one target node from the at least one candidate node, the source node buffers data to be forwarded to the mobile node until after the mobile node identifies the one target node and begins forwarding the buffered data and subsequent data to the one target node.

25. A mobile node that performs a low latency handoff between source and target nodes, comprising:

a trigger source that triggers the mobile node to initiate the handoff process;

a locator that identifies at least one candidate node to the source node, which establishes a tunnel between the source node and each of the at least one candidate node before the mobile node completes an L2 handoff from the source node; and a detector that identifies one target node from the at least one candidate node to the source node, which removes the tunnel(s) except the tunnel for the one target node, wherein using the tunnel for the one target node, the mobile node keeps data communication with the source node through the one target node after the mobile node completes the L2 handoff from the source node to the one target node but before undergoing IP routing update with the one target node.

26. A mobile node according to claim 25, wherein the trigger source triggers the mobile node to initiate the handoff process when the mobile node notices existence of at least one candidate node.

27. A mobile node according to claim 26, wherein broadcast signaling from a candidate node functions to notify the mobile node of existence of the node.

28. A mobile node according to claim 27, wherein the broadcast signaling from the candidate node is L2 pilot beacon signaling.

29. A mobile node according to claim 25, wherein a link up between the mobile node and the one target node triggers the detector to identify the one target node.

30. A mobile node according to claim 25, wherein the mobile node identifies the one target node to the source node.

31. A mobile node according to claim 25, wherein the one target node identifies itself to the source node.

32. A mobile node according to claim 25, wherein triggered by a link down with the mobile node, the source node begins forwarding data to one or more of the at least one candidate node through one or more of the tunnels.

33. A mobile node according to claim 32, wherein if the link down with the mobile node occurs between the source node establishes a tunnel between the source node and each of the at least one candidate node but before the detector identifies the one target node, the source node begins forwarding data to all the at least one candidate node.

34. A mobile node according to claim 32, wherein if the link down with the mobile node occurs after the detector identifies the one target node, the source node begins forwarding data to the one target node.

35. A mobile node according to claim 32, wherein if the link down with the mobile node occurs after the source node establishes a tunnel between the source node and each of the at least one candidate node but before the detector identifies the one target node, the source node buffers data to be forwarded to the mobile node until after the detector identifies the one target node and begins forwarding the buffered data and subsequent data to the one target node.

* * * * *